United States Patent
Leydier et al.

(10) Patent No.: US 8,266,451 B2
(45) Date of Patent: Sep. 11, 2012

(54) VOICE ACTIVATED SMART CARD

(75) Inventors: Robert A. Leydier, La Londe les Maures (FR); Bertrand du Castel, Austin, TX (US)

(73) Assignee: Gemalto SA, Meudon (FR)

( * ) Notice: Subject to any disclaimer, the term of this patent is extended or adjusted under 35 U.S.C. 154(b) by 2926 days.

(21) Appl. No.: 09/945,123

(22) Filed: Aug. 31, 2001

(65) Prior Publication Data

US 2003/0046554 A1 Mar. 6, 2003

(51) Int. Cl.
*G06F 21/00* (2006.01)

(52) U.S. Cl. ........ 713/193; 713/189; 704/246; 704/231; 704/200; 235/380; 235/382; 235/382.5; 235/375; 726/2; 726/16; 726/17; 726/20

(58) Field of Classification Search .......... 713/172–173, 713/182, 185–186, 200–202, 340; 709/223–229; 704/231, 246, 251; 379/88.01–88.02; 73/1.48; 382/121

See application file for complete search history.

(56) References Cited

U.S. PATENT DOCUMENTS

| | | | |
|---|---|---|---|
| 3,690,144 A * | 9/1972 | Bonny | 73/1.51 |
| 3,856,995 A * | 12/1974 | Cragg et al. | 381/338 |
| 4,303,908 A * | 12/1981 | Enemark et al. | 340/384.6 |
| 4,751,419 A * | 6/1988 | Takahata | 310/324 |
| 4,827,518 A | 5/1989 | Feustel et al. | |
| 4,851,654 A * | 7/1989 | Nitta | 235/492 |
| 4,961,229 A * | 10/1990 | Takahashi | 704/246 |
| 5,136,885 A * | 8/1992 | Liebermann et al. | 73/702 |
| 5,249,467 A * | 10/1993 | Takashima | 73/702 |
| 5,623,539 A * | 4/1997 | Bassenyemukasa et al. | 379/88.02 |
| 5,708,853 A * | 1/1998 | Sanemitsu | 710/73 |
| 5,987,155 A * | 11/1999 | Dunn et al. | 382/116 |
| 6,016,476 A * | 1/2000 | Maes et al. | 705/18 |
| 6,052,662 A * | 4/2000 | Hogden | 704/256.2 |
| 6,075,983 A | 6/2000 | Kumagai | |

(Continued)

FOREIGN PATENT DOCUMENTS

DE 199 16 308 A1 10/2000

(Continued)

OTHER PUBLICATIONS

International Search Report in PCT/US02/26080 dated Nov. 15, 2002 (5 pages).

*Primary Examiner* — Syed A. Zia
(74) *Attorney, Agent, or Firm* — Pehr B. Jansson; The Jansson Firm (57) ABSTRACT

A portable device including a biometric voice sensor configured to detect voice information and to take an action in response to speech spoken into the voice sensor. The device also includes a voice processor configured to process the voice sensor signal characteristics. The portable device may encrypt the detected signal and may compare the detected signal characteristics with voice characteristics that are stored in a memory of the portable device for applications such as voice enabled authentication, identification, command execution, encryption, and free speech recognition. The voice sensor may include a thin membrane portion that detects pressure waves caused by human speech. The portable device may be a contact-type smart card, a contactless smart card, or a hybrid smart card with contact and contactless interfaces. The device may be powered by an internal battery or by a host via contacts or by a power signal making use of the antenna in a contactless implementation.

43 Claims, 10 Drawing Sheets

U.S. PATENT DOCUMENTS

| | | | | |
|---|---|---|---|---|
| 6,084,967 | A * | 7/2000 | Kennedy et al. | 380/247 |
| 6,092,192 | A * | 7/2000 | Kanevsky et al. | 713/186 |
| 6,194,810 | B1 * | 2/2001 | Chauvet | 310/317 |
| 6,219,439 | B1 * | 4/2001 | Burger | 382/115 |
| 6,256,609 | B1 | 7/2001 | Byrnes et al. | |
| 6,325,285 | B1 * | 12/2001 | Baratelli | 235/380 |
| 6,382,516 | B1 * | 5/2002 | King | 235/492 |
| 6,401,029 | B1 * | 6/2002 | Kubota et al. | 701/408 |
| 6,411,933 | B1 * | 6/2002 | Maes et al. | 704/273 |
| 6,574,596 | B2 * | 6/2003 | Bi et al. | 704/249 |
| 6,598,481 | B1 * | 7/2003 | Schultz | 73/702 |
| 6,655,585 | B2 * | 12/2003 | Shinn | 235/382 |
| 6,720,712 | B2 * | 4/2004 | Scott et al. | 310/339 |
| 6,792,536 | B1 * | 9/2004 | Teppler | 713/178 |
| 6,798,334 | B1 * | 9/2004 | Meister et al. | 340/5.52 |
| 6,817,130 | B2 * | 11/2004 | Ivanov | 42/70.06 |
| 6,963,659 | B2 * | 11/2005 | Tumey et al. | 382/116 |
| 6,968,453 | B2 * | 11/2005 | Doyle et al. | 713/168 |
| 7,106,843 | B1 * | 9/2006 | Gainsboro et al. | 379/191 |
| 7,337,326 | B2 * | 2/2008 | Palmer et al. | 713/186 |
| 7,383,297 | B1 * | 6/2008 | Atsmon et al. | 709/200 |
| 7,475,044 | B1 * | 1/2009 | Kawai et al. | 705/65 |
| 7,620,759 | B2 * | 11/2009 | Colnot | 710/106 |
| 7,747,797 | B2 * | 6/2010 | Abraham et al. | 710/62 |
| 7,917,949 | B2 * | 3/2011 | Conley | 726/20 |
| 7,996,230 | B2 * | 8/2011 | Doren | 704/273 |
| 8,015,592 | B2 * | 9/2011 | Doughty et al. | 726/2 |
| 8,144,941 | B2 * | 3/2012 | Adams et al. | 382/115 |
| 8,161,289 | B2 * | 4/2012 | Conley | 713/186 |
| 2001/0048025 | A1 * | 12/2001 | Shinn | 235/382 |
| 2002/0020752 | A1 * | 2/2002 | King | 235/492 |
| 2002/0071537 | A1 * | 6/2002 | Gainsboro | 379/188 |
| 2002/0095587 | A1 * | 7/2002 | Doyle et al. | 713/186 |
| 2002/0169988 | A1 * | 11/2002 | Vandergeest et al. | 713/201 |
| 2003/0212893 | A1 * | 11/2003 | Hind et al. | 713/177 |
| 2004/0220807 | A9 * | 11/2004 | Tamir et al. | 704/246 |
| 2004/0221168 | A1 * | 11/2004 | Girard | 713/193 |

FOREIGN PATENT DOCUMENTS

| | | | | |
|---|---|---|---|---|
| EP | 0271835 | * | 11/1987 | 713/186 |
| WO | WO 01/86599 A2 | | 11/2001 | |

* cited by examiner

FIG. 1

PRIOR ART

FIG. 2

PRIOR ART

VOICE ACTIVATED SMART CARD

BACKGROUND

1. Field of the Present Invention

The present invention generally relates to the field of Integrated Circuit Cards (ICC), commonly referred to as smart cards, and more particularly to a smart card with an integrated circuit that is able to receive and process user voice information for tasks such as authentication, identification, command execution and other applications.

2. History of Related Art

A smart card is a credit-card sized plastic card that includes an Integrated Circuit (IC) embedded in the card's bulk plastic. The smart card's IC includes memory and may include a micro-controller. The smart card communicates with the external world using contacts or contactless (wireless) techniques. Applications for smart cards are growing rapidly and include Global System for Mobile (GSM) telephones that use Subscriber Identity Module (SIM) smart cards containing mobile phone security and subscription information, satellite TV set top box receivers that use smart cards containing keys to decipher the incoming signal. Other applications include credit and debit cards, national health cards, pre paid pay phone cards, Internet user authentication cards, Public Key Infrastructure (PKI) cards, driver's license cards, passport cards, retailer loyalty cards, mass transit cards, and toll cards.

Figure 1:
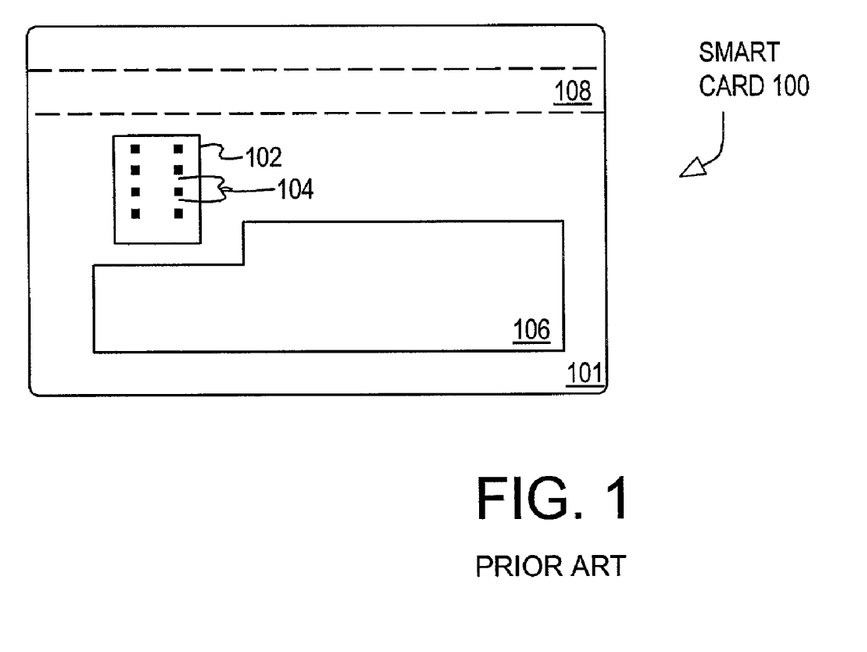
FIG. 1 is a top view of a smart card according to the prior art.
Figure 2:
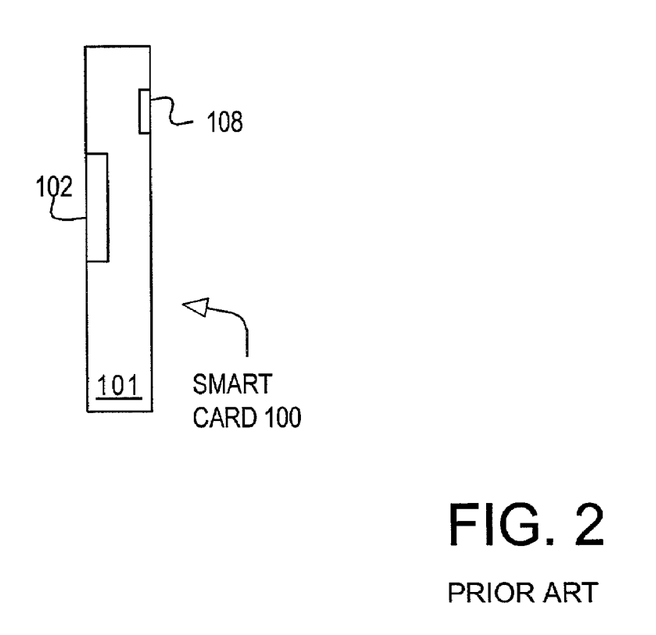
FIG. 2 is a sectional view of the smart card of FIG. 1.

Referring to FIG. 1 and FIG. 2, a top view and side view respectively of a typical smart card 100 are depicted. Smart card 100 is a portable device that includes a plastic substrate 101 into which an integrated circuit module 102 is embedded. Smart card 100 and integrated circuit module 102 (hereinafter referred to as "module 102") are compliant with Standard 7816 of the International Standardization Organization (ISO) commonly referred to as "ISO 7816."

Module 102 includes a set of eight contacts 104 that provide an external interface for smart card 100. Smart card 100 may further include a magnetic stripe 108 that contains information such as the cardholder's account number and Personal Identification Number (PIN) and, an embossed area 106 that may display information about the cardholder including the cardholder's name. Smart card 100 may further include additional elements, such as micro printing and a hologram that contribute to the smart card's security. Counterfeiting a smart card is difficult compared to stealing a plastic card number. The PIN stored in a smart card's IC is less at risk than a PIN stored on the magnetic stripe. Smart card security refers to the ability of the smart card to resist counterfeiting and encompasses cardholder authentication before processing any transactions.

Figure 3:
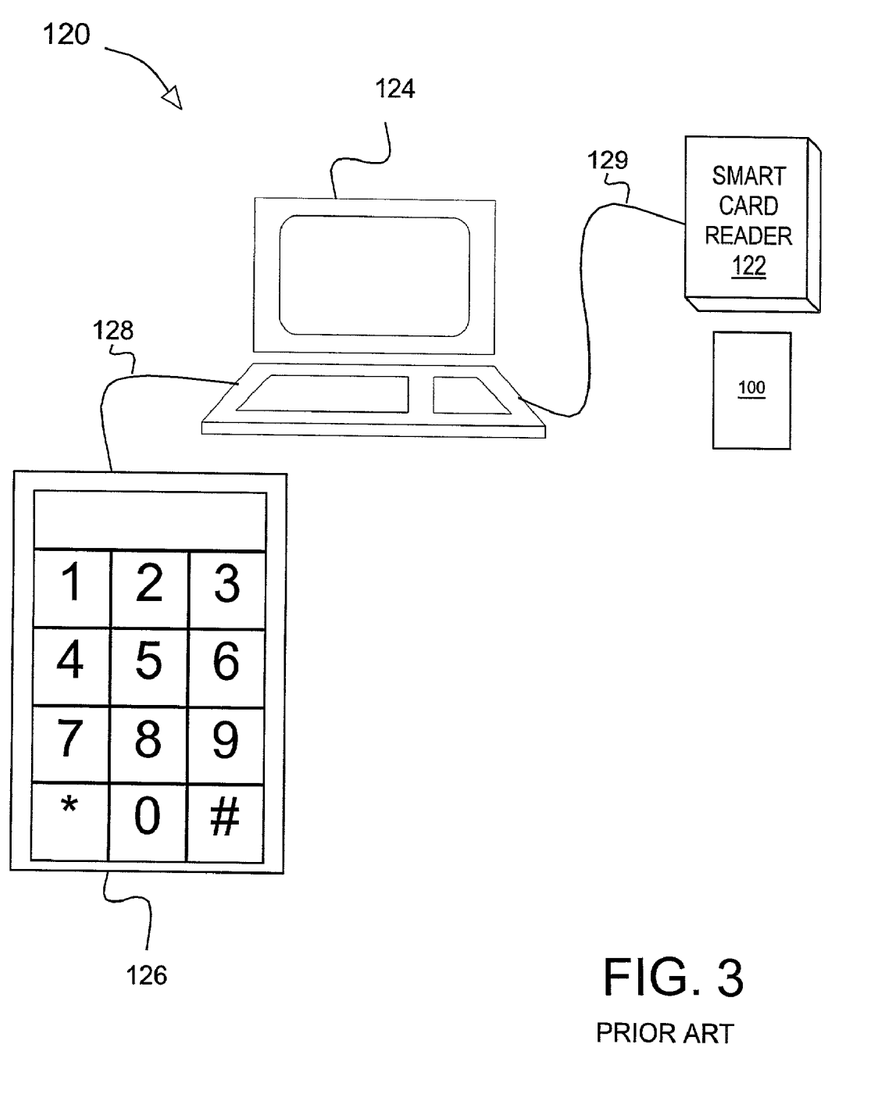
FIG. 3 is a block diagram of selected elements of a smart card system according to the prior art.

Referring to FIG. 3, a typical system 120 and method for using and authenticating smart card users is depicted. In the depicted embodiment, the system 120 includes a smart card reader 122, a data processing system 124, and a keypad 126. The reader 122 includes a slot suitable for receiving smart card 100 and an interface (not depicted) for contacting the contacts 104 of smart card 100. The reader 122 is connected to data processing device 124, which may be implemented as a desktop or laptop computer, a point of sale device, or some other suitable data processing device. Data processing device 124 includes software that enables it to communicate information to and from smart card 100 when the smart card is inserted in the smart card reader 122.

The keypad 126 is also connected to data processing device 124 via a suitable serial or parallel port. Data processing device 124 is able to detect a keystroke sequence entered by a holder of smart card 100 on keypad 126. Smart card 100 is enabled to compare the user entered keypad sequence with information (such as a PIN) stored on smart card 100 to authenticate the user as the authorized holder of smart card 100. Other prior art systems may replace the keypad 126 with other devices including biometric sensing devices. Biometric techniques are well suited for authentication applications as well as identification. Every individual has unique biologic characteristics. Identification processes sense at least one of these unique characteristics, such as fingerprint, iris or voice, to distinguish the user from other users. The smart card 100 compares biometric data from the external sensing device to previously generated biometric data stored in smart card 100 to identify the user.

Regardless of the particular embodiment employed, it will be appreciated that the personalized information used to identify and/or authenticate the holder of the smart card 100 must travel from the keypad 126 (or other sensing device) to the smart card 100. The private information transits temporarily through the data processing device 124 and cables 128 and 129.

Physical constraints on the size of smart card 100 have prevented the incorporation of typical keypads or sensing devices on the card itself. The user information (i.e., PIN information or biometric data) travels externally to smart card 100 as part of the authentication process. Because the user information must travel externally to smart card 100, there is increased opportunities for an unauthenticated user to intercept the authentication information and use the information in an unauthorized manner. It would, therefore, be beneficial to implement a system and method for using smart card technology in which the smart card is able to detect biometric information on-chip to authenticate and identify the user.

BRIEF DESCRIPTION OF THE DRAWINGS

Objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in details. It should be understood, however, that the drawings and detailed description presented herein are not intended to limit the invention to the particular embodiment disclosed. On the contrary, only the claim language limits the invention.

DETAILED DESCRIPTION OF THE INVENTION

Throughout the description and the drawings, elements that are the same will be accorded the same reference numerals.

Generally speaking the invention contemplates a portable device such as a smart card that includes an integrated circuit having a biometric voice sensor and a signal processing circuit. The biometric voice sensor produces an electrical signal in response to voice waves in the vicinity. The electrical signal has characteristics that are indicative of the speaker's identity. The signal processing circuit is configured to analyze the electrical signal to detect the signal characteristics and compare the signal characteristics to information stored in memory for performing tasks such as authenticating the user, identifying the user, executing a voice-transmitted command, encrypting a user's voice, speech recognition, and other applications.

The voice sensor may be implemented with a piezoelectric pressure sensing mechanism, a capacitive bridge pressure sensing mechanism, a pair of ring oscillators, or with another suitable mechanism for detecting voice signals. The voice sensor may include a thin membrane portion that detects pressure waves caused by human speech. The membrane may be fabricated with semiconductor fabrication micro-machining techniques that are used in conjunction with a CMOS fabrication process. As such, the portable device may comprise a Micro Electro Mechanical System (MEMS) device. The micro machining may be performed as a wafer scale post processing step or sequence of steps after the CMOS processing of the integrated circuits is complete.

The integrated circuit may further include a processor, memory, and sufficient code to analyze a signal generated by the voice sensor and compare the signal's characteristics to voice information stored in memory for user authentication, user identification, command execution, encryption, and speech recognition.

User authentication refers to the ability to assert the identity of a user. Authentication may including comparing a user speech sample to a predetermined speech pattern or sequence, such as a password or pass phrase, to enable the user to access other device functions or information. Authentication may further include the use of static or user alterable passwords wherein the integrated circuit compares a word or groups of words spoken by a user to password information stored in the integrated circuit memory. The stored password or pass phrase information may include a digital representation of the signal generated by the voice sensor when the password is spoken into the sensor.

User identification refers to the ability of the device to distinguish a particular user from other users. The device may identify a user by comparing the characteristics of the voice sensor signal produced when the user speaks into the device to voice characteristics stored in memory. The voice characteristics stored in memory are indicative of the unique voice characteristics of a particular person. Thus, an identification process may be performed independent of the speech content in the same manner that the human ear is able to identify individuals by their speech regardless of what is being said.

In addition to authorization and identification, the device may further enable other features including the execution of voice-transmitted commands, encryption and the recognition of free speech.

In the command execution mode, the device compares a word or group of words spoken by a user (presumably after identifying and/or authorizing the user) to pre-loaded command words stored in the memory. If a match is detected, the device performs a defined command sequence corresponding to the matched command. The commands may be prerecorded or changeable.

The invention may further enable encryption of the signal generated by the voice sensor using an algorithm stored on the card or downloaded onto the card through the contact or contact-less link. The encrypted signal may then be transmitted securely outside the card using the same link or another one.

In the free speech recognition mode, the integrated circuit "listens" to words spoken by the user such as by capturing the user's speech and identifying selected keywords in the speech. The device may then process the captured speech based on the content. The device could, for example, classify messages according to keywords in the message.

The smart card may be a contact-type smart card, a contactless smart card, or a hybrid contact and contactless smart card. The smart card may be powered by an internal battery or by a host via contacts or by a power signal transmitted through the smart card wireless port in a contactless implementation.

By integrating a mechanism for sensing voice information and means for analyzing the voice information on a single integrated circuit, the invention beneficially reduces the opportunity for unauthorized or fraudulent use of the portable device and improves the card's ease of use. Moreover, by implementing the analyzing circuitry with integrated circuit technology using standard integrated circuit processing techniques, the portable device according to the present invention achieves these benefits without substantially affecting the cost of producing the device.

Figure 4:
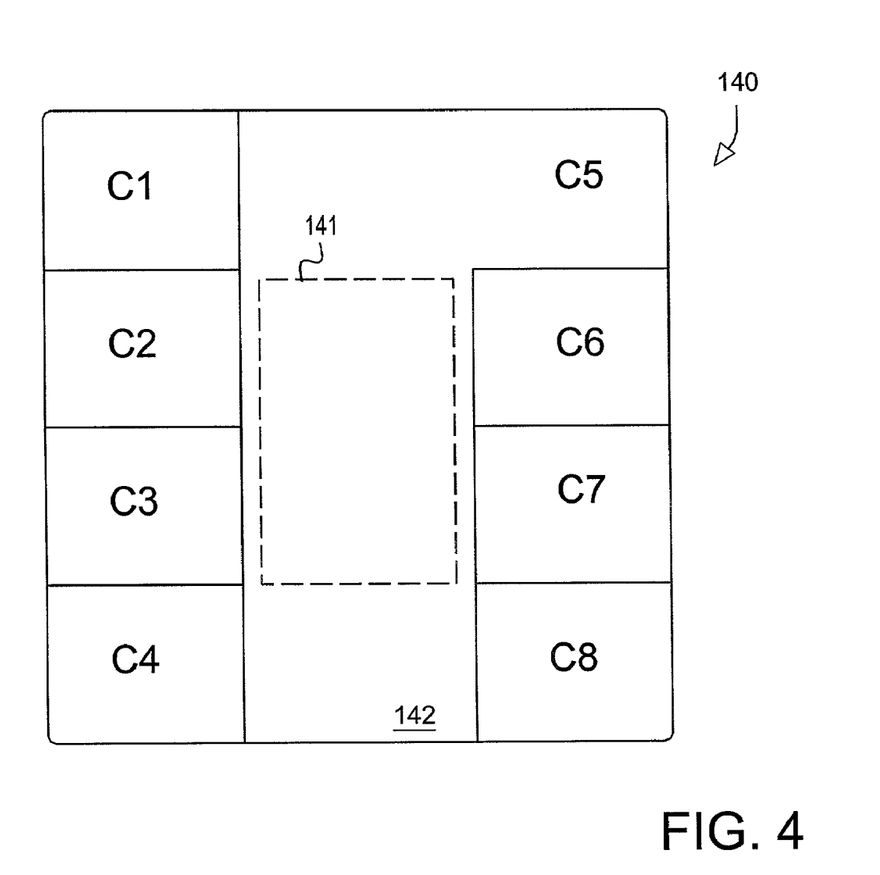
FIG. 4 depicts a module suitable for use in a smart card according to one embodiment of the invention.
Figure 5:
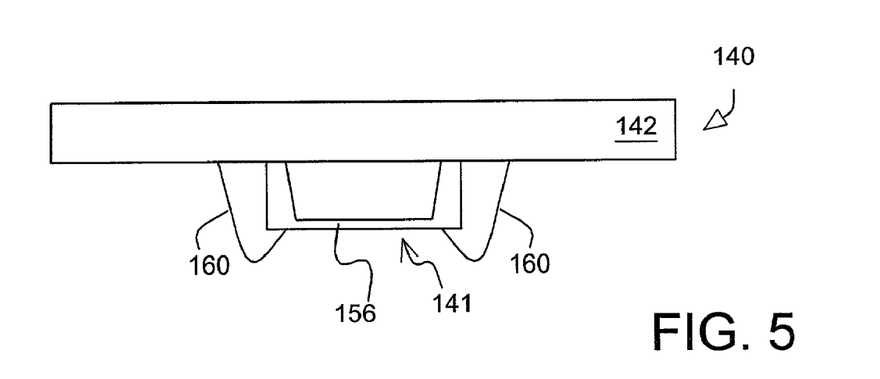
FIG. 5 is a side view of a smart card integrated circuit module according to one embodiment of the invention.
Figure 6:
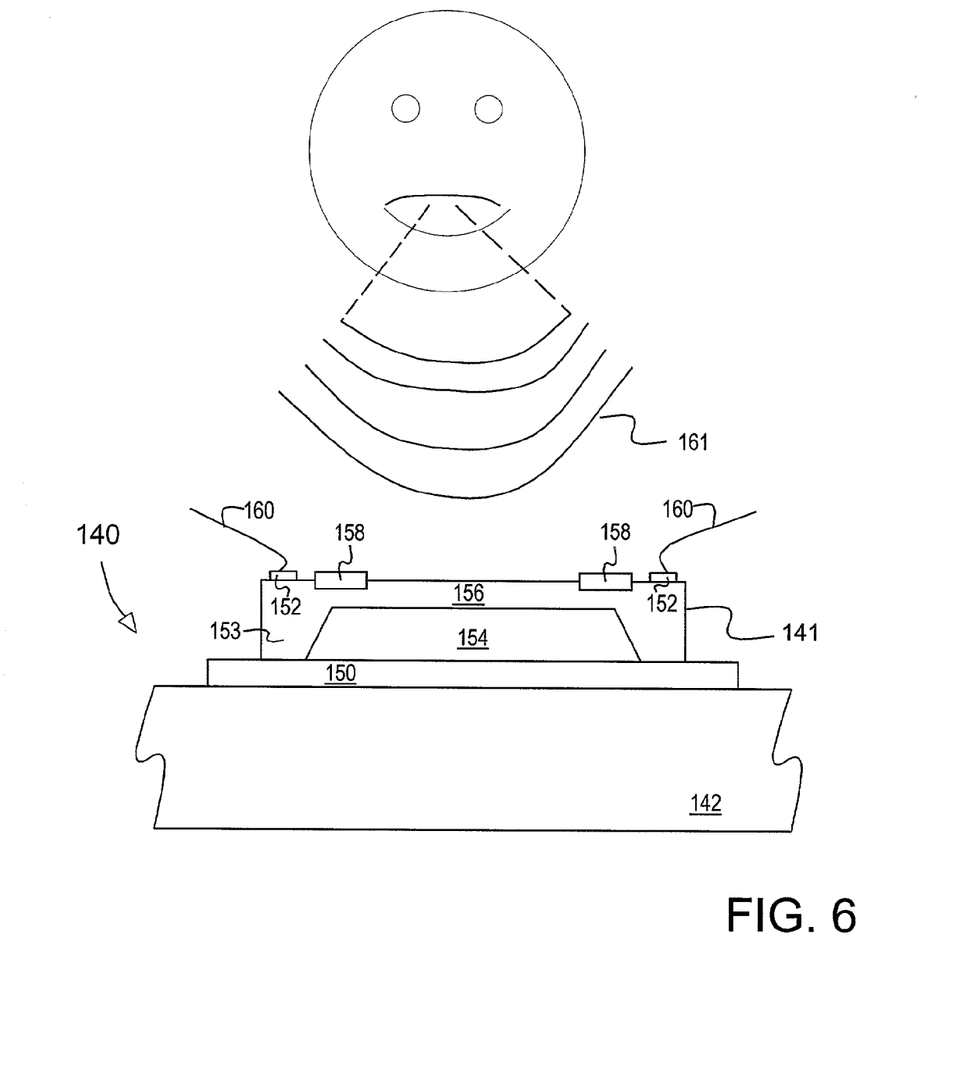
FIG. 6 illustrates the use of a smart card employing a piezoelectric pressure sensor according to one embodiment of the invention.

Referring to FIG. 4, FIG. 5, and FIG. 6, alternative views of a portable device or module 140 according to one embodiment of the present invention are depicted. In the depicted embodiment, module 140 includes an integrated circuit 141 and may be implemented as a smart card in which the integrated circuit is attached to a lead frame 142 with an adhesive film 150. Integrated circuit 141 includes a set of pads 152 that are electrically connected to the contacts C1 through C8 by a set of bonding wires 160.

The depicted embodiment of module 140 is configured to receive and detect variations in pressure such as the pressure variations caused by the voice pressure waves 161 of someone speaking in the vicinity of module 140. Integrated circuit 141 is typically formed from a single-crystalline substrate or bulk 153 comprised of a semiconductor material such as silicon. Integrated circuit 141 is typically fabricated with a semiconductor fabrication process that includes a conventional CMOS process for creating memory, processing units, and external interfaces.

The fabrication of integrated circuit 141 may further include a backside process to create a cavity 154 in the backside of the wafer. Cavity 154 produces a membrane 156 that comprises a sensing element of integrated circuit 141. Membrane 156 is a relatively thin portion of integrated circuit 141 created at the wafer level using a wet or dry silicon micromachining process that is typically performed after the "front side" CMOS structures are completed. A typical thickness of membrane 156 is 10.0 to 25.0 micrometers.

Suitable micro-machining processes may include a wet process in which the membrane portions of the wafer are selectively exposed to a KOH solution using conventional photolithography techniques or a dry process in which the membrane portions of the wafer are subjected to a reactive ion etch (RIE) process. Either of these micromachining processes are compatible with CMOS processed wafers.

Integrated circuit 141, as depicted in FIG. 6, further includes a set of piezoelectric gauges 158 that may be implanted into the integrated circuit 141 at appropriate locations in proximity to membrane 156 using conventional semiconductor fabrication processes. Gauges 158 are typically polysilicon resistors or implanted resistors submitted to parallel stress or perpendicular stress in the vicinity of the cavity. Parallel stress will reduce the resistor value while perpendicular stress will increase the resistor value. Gauges 158 as depicted in FIG. 6 are configured as a Wheatstone bridge. Any voice pressure wave P(t) 161 applied on the membrane 156 modifies the Wheatstone bridge output voltage. In this manner, the deflections in membrane 156 are converted into an electrical signal Vs(P(t)) that is suitable for conventional signal processing. Since the voice characteristics of each person are unique, it is theorized that the voice waves 161 will result in a deflection pattern of membrane 156 that is also unique. The unique deflection pattern of membrane 156 will translate into a correspondingly unique electrical signal having signal characteristics that can be used to identify the speaker.

Figure 7:
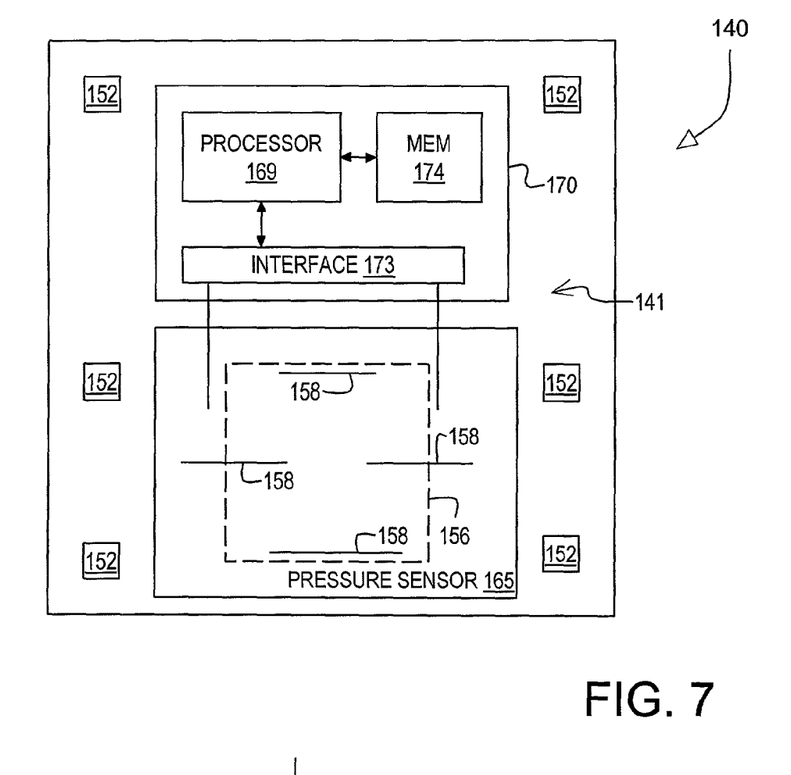
FIG. 7 is a diagram of a module employing a piezoelectric transducer suitable for use in the smart card of FIG. 6.
Figure 8:
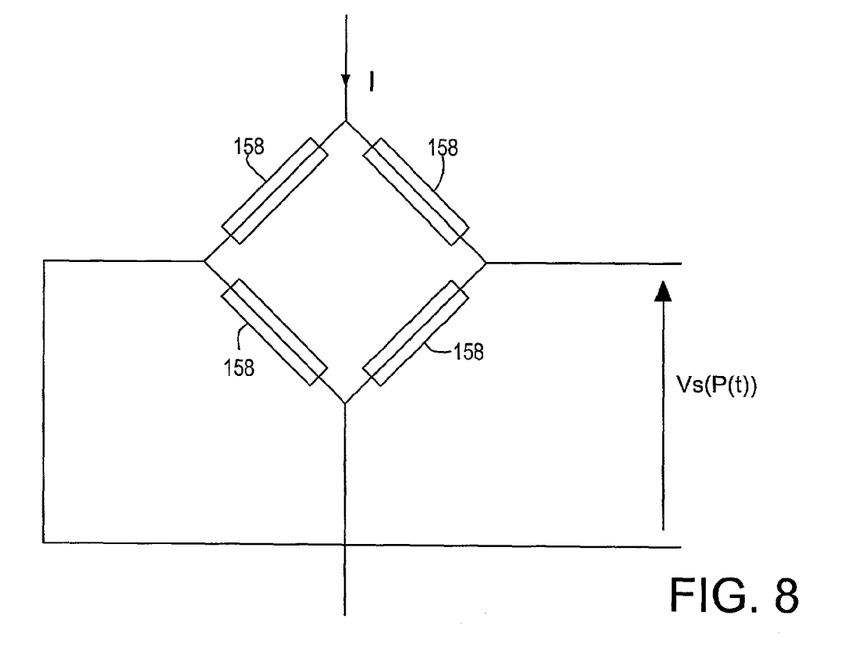
FIG. 8 is a circuit diagram of the piezoelectric transducer suitable for use in the smart card of FIG. 6.
Figure 9:
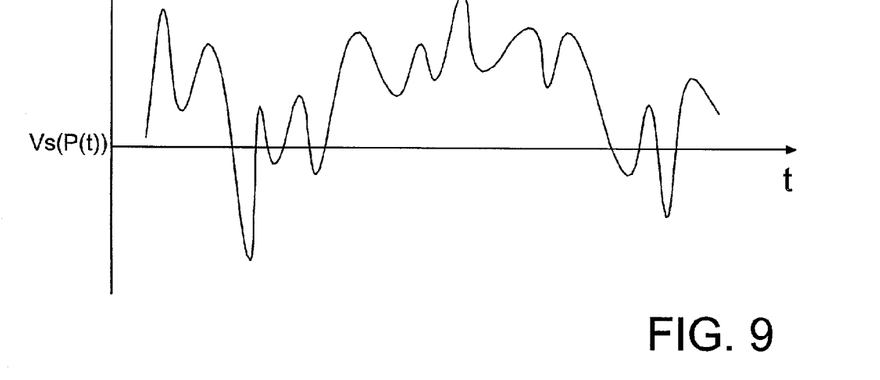
FIG. 9 is a drawing illustrating operation of the circuit of FIG. 8.

Referring to FIG. 7, a block diagram of selected elements of an embodiment of integrated circuit 141 is depicted. In the depicted embodiment, integrated circuit 141 includes a pressure sensor 165 as described in FIG. 6 comprising a set of piezoelectric gauges 158 arranged in proximity to the membrane portion 156 of the integrated circuit. As seen in FIG. 8, gauges 158 may be connected in a Wheatstone bridge configuration to compensate for drifts, offsets, and changes in temperature and other environmental factors. In this configuration, pressure sensor 165 senses pressure variations P(t) that cause deflections of membrane 156 and produce a corresponding voltage signal Vs(P(t)). The voltage signal Vs(P(t)), as graphically illustrated in FIG. 9, varies with the magnitude of the membrane deflection such that Vs(P(t)) is indicative of the sensed pressure variations.

The voltage signal Vs(P(t)) is provided to an input port of a voice processing circuit 170 of integrated circuit 141. Processing circuit 170 includes a processor 169, a storage facility or memory 174, and an interface 173. Memory 174 may include volatile storage such as DRAM or SRAM as well as non-volatile storage in the form of flash memory, ROM, EEPROM, or Ferroelectric RAM (FRAM). Processor 169 receives the voltage signal Vs(P(t)) from pressure sensor 165 via interface 173. Interface 173 may include suitable analog-to-digital conversion circuitry, sampling circuitry, and the like. In one embodiment, interface 173 is configured to provide a digital signal to processor 169 where the digital signal is indicative of Vs(P(t)).

Processor 170 is configured to execute code that to analyze the signal received from interface 173 and derive characteristics of the signal corresponding to the voice sample using conventional signal processing and voice recognition techniques. Processor 170 then determines if the derived set of signal characteristics matches a predefined set of characteristics that is stored in memory 174. The predefined set of characteristics is presumably the characteristic signature of the authorized user. As such, the predefined set of characteristics may comprise the digital equivalent of the voltage signal Vs(P(t)) that results when the authorized user speaks a verbal sequence of one or more words into the smart card.

In one embodiment, the predefined set of characteristics is loaded into memory 174 by the vendor or distributor of module 140 and the module holder is prevented from altering them. The module vendor or distributor may obtain a voice sample from the module holder, convert the sample to a digital signature, and load the digital signature into an undisclosed portion of memory 174. In another embodiment, module 140 may be distributed or sold as a "blank" that contains no pre-loaded voice signature. Before module 140 may be used, the cardholder may personalize the module by executing a personalization sequence that resides in memory 174. The personalization sequence may request the module holder to speak one or more words or phrases into the module. From these voice samples, module 140 determines the voice signature of the user and loads the signature into memory 174. Alternatively, a blank module may be personalized by downloading via a contact or contactless link a voice signature from an external data processing system such as a desktop or laptop personal computer. The voice signature that is stored in memory 174, whether pre-loaded by the device distributor or personalized by the user, provides a security mechanism or lock that prevents others from obtaining authorization to use the module.

The information in memory 174 may include information that is indicative of the voice characteristics of multiple authorized users (e.g., a husband and wife). In this embodiment, module 140 is configured to identify and authenticate each of the multiple users uniquely. Moreover, memory 174 may contain user specific profile information for each of the multiple authorized users. Module 174 may use the profile information to customize user specific parameters (e.g., credit limit) or otherwise enable user specific functionality.

In one embodiment, the authorization sequence permits "free speech" identification and authorization in which the module holder may speak any phrase or word sequence. In this embodiment, identification and authorization of the user is based on the user's general voice characteristics independent of the words that are spoken. In another embodiment, the authorization sequence may require the module holder to speak a password comprising a predetermined word or phrase. The password may or may not be alterable by the module holder depending upon the implementation.

In another embodiment, the pressure sensor comprises two ring oscillators each having an odd number of CMOS inverters, for example eleven, that are configured to convert the voice pressure into an electrical signal. The first ring oscillator is placed over the membrane such that its output frequency F1 increases with the voice pressure while the second ring oscillator is placed over the membrane such that its output frequency F2 decreases with the voice pressure. Combining both frequencies in a ratio F1/F2 gives a signal related to the voice pressure while temperature effects and static errors are minimized and sensitivity optimized.

Figure 10:
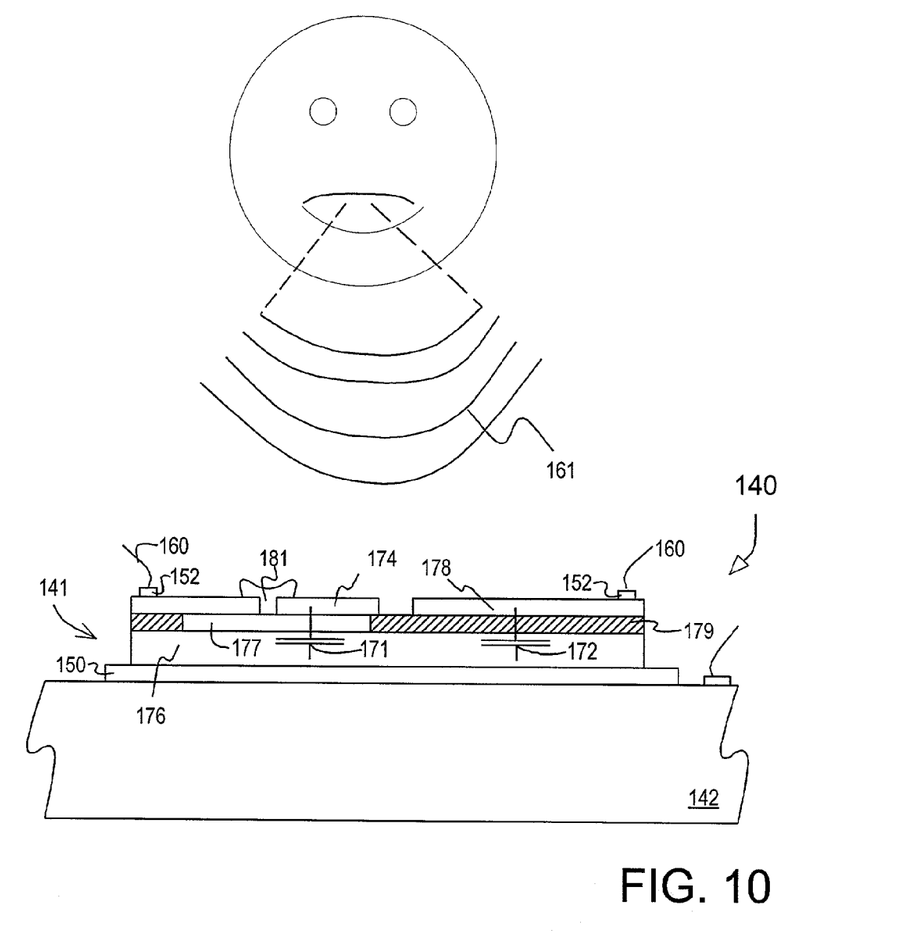
FIG. 10 illustrates use of a smart card employing a capacitive pressure sensor according to one embodiment of the invention.

Referring now to FIG. 10, an embodiment of module 140 is depicted in which the pressure sensor is implemented with a pair of capacitors 171 and 172. This embodiment of the pressure sensor, unlike the piezoelectric and ring oscillator sensors described previously, does not require the thin membrane and its corresponding cavity. The insulator for the first capacitor 171 is a vacuum 177 while the insulator for the second capacitor is a dielectric 179 such as silicon dioxide ($SiO_2$). In this embodiment, voice pressure waves act on an electrode of first capacitor 171 to vary its capacitance while the capacitance of second capacitor 172 remains substantially constant over the pressure variations typically induced by human speech. The difference in capacitance between the two capacitors provides an indicator of the pressure that is indicative of the speaker's voice characteristics.

As depicted in FIG. 10, an embodiment of smart card module 140 includes an integrated circuit 141 attached to a lead frame 142 with an adhesive film 150. Integrated circuit 141 includes a pressure sensor that includes a first capacitor 171 and a second capacitor 172. First capacitor 171 includes a first conductive plate (electrode) 174 typically comprised of heavily doped polysilicon, a refractory metal, or a metal such as aluminum or copper. Capacitor 171 further includes a second conductive plate 176 that may comprise a doped portion of the silicon substrate of integrated circuit 141. First plate 174 and second plate 176 are isolated by a void 177. Void 177 provides the electrical insulator layer for capacitor 171. Void 177 may be formed by initially depositing or growing a film, such as an oxide film, over second plate 176 prior to depositing first plate 174. After first plate 174 is deposited, a via may be opened in first plate 174 to provide access to the oxide film. An appropriate wet etch solution may then be used to remove the oxide film (or other suitable film) between the first and second plates. After the wet etch process forms void 177, a plug 181 is then formed to seal the vacuum, which acts as the capacitor dielectric.

Figure 11:
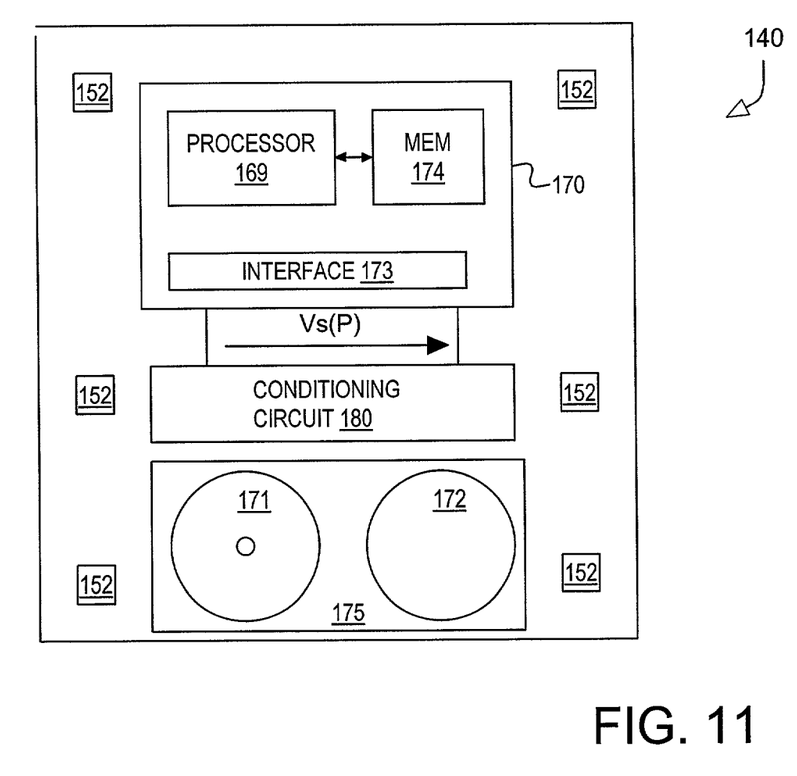
FIG. 11 is a diagram of a module employing a capacitive transducer suitable for use in the smart card of FIG. 10.
Figure 12:
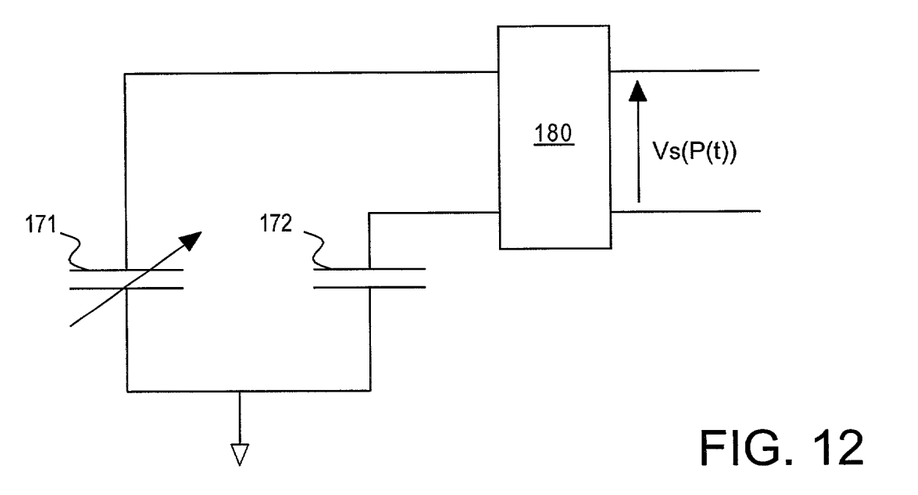
FIG. 12 is a circuit diagram of a capacitive transducer suitable for use in the smart card of FIG. 10.

Second capacitor 172 includes a first plate 178 typically comprised, like first plate 174 of first capacitor 171, of heavily doped polysilicon or other suitable conductive material. Second capacitor 172 may share a common second plate 176 with first capacitor 171. Unlike first capacitor 171, however, second capacitor 172 includes a solid dielectric film 179 that serves as the capacitor's dielectric. The dielectric film 179 may be comprised of silicon dioxide, silicon nitride, silicon oxynitride, or another suitable dielectric film. Referring now to FIG. 11 and FIG. 12, a block diagram view and a circuit view of an embodiment of module 140 that include the capacitive pressure sensor 175 described above with respect to FIG. 10 are depicted. First and second capacitors 171 and 172 may be electrically connected to a signal conditioning circuit 180 in a half-bridge configuration as depicted in FIG. 12 to compensate for drifts and offsets. The signal conditioning circuit 180 translates the capacitance variations it detects between first capacitor 171 and second capacitor 172 into a voltage signal Vs(P(t)). The voltage signal Vs(P(t)) is indicative of the capacitance variation of first capacitor 171 (assuming that the capacitance of second capacitor 172 is essentially constant over the pressure variations contemplated) and, therefore, is indicative of pressure variations caused by the speaker. The voltage signal Vs(P(t)) may then be passed to a processing circuit 170 for signal analysis and comparison with a pre-loaded voice signature as discussed previously with respect to processing circuit 170 of FIG. 7.

This embodiment of the pressure sensor thus includes a mechanism for comparing a first signal that varies with the voice pressure wave against a second signal that is substantially pressure wave invariant. The first and second signals are compared to each other to determine the magnitude of the pressure wave. In the case of a capacitive pressure sensor, the first and second capacitors are fabricated with and without a vacuum to achieve the pressure wave sensitivity. The second capacitor, whose capacitance does not vary substantially with pressure, is used to provide a measure of other factors that may affect the measure signal (capacitance) including temperature, drift, offset, and other factors that are unrelated to the pressure wave.

Figure 13:
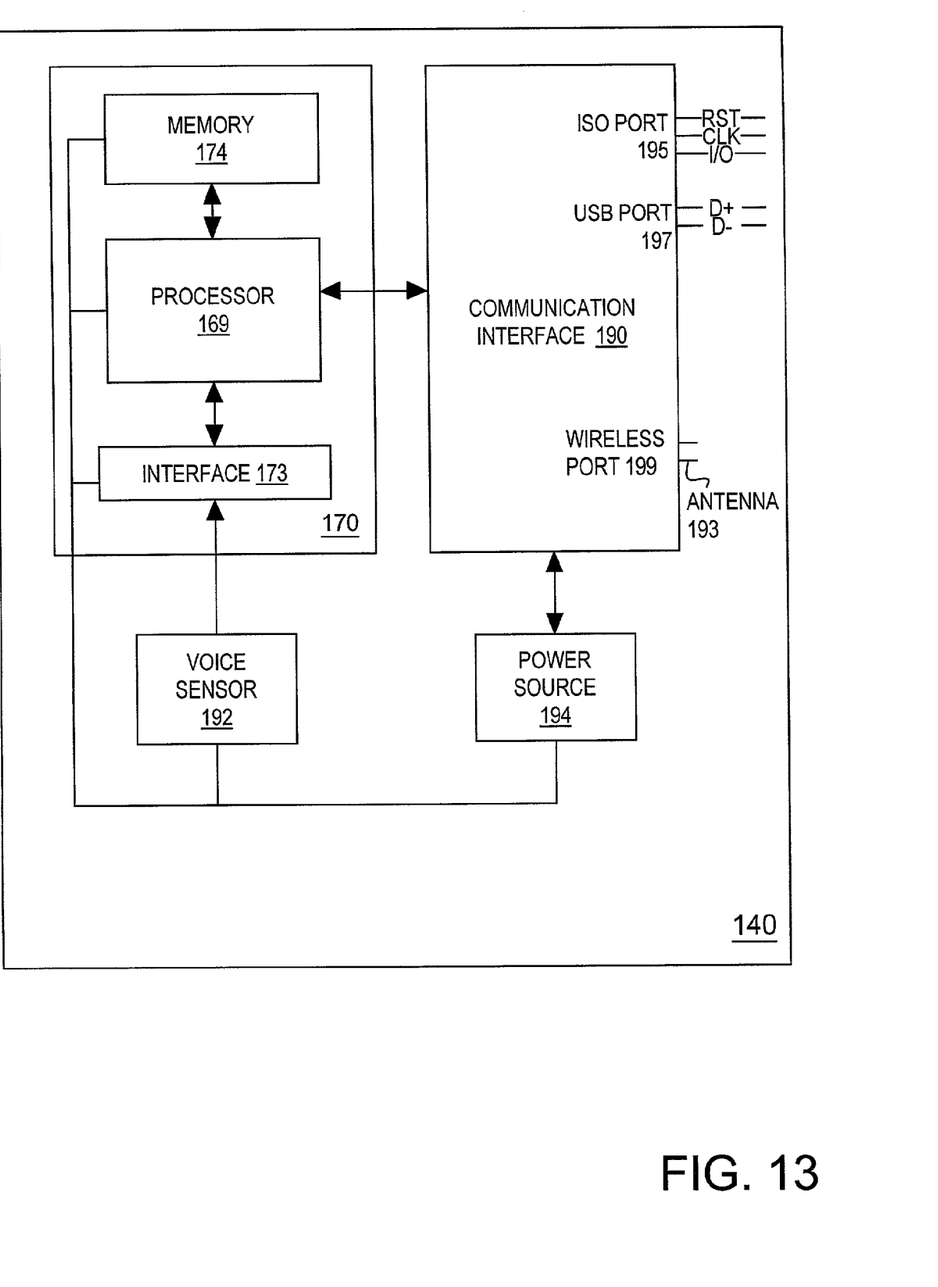
FIG. 13 is a block diagram of selected elements of a module.

Referring now to FIG. 13, a block diagram showing selected elements of module 140 is depicted to illustrate additional features of the invention. As illustrated in FIG. 13, smart card module 140 includes a biometric voice sensor 192 (also referred to throughout this disclosure as simply voice sensor 192) that is connected to the processor 169. As used in this disclosure, a biometric voice sensor refers to a sensor that is able to identify individuals uniquely based on their voices.

Biometric voice sensor 192 may be implemented as a pressure sensor as discussed previously. In other embodiments, however, voice sensor 192 may employ alternative means for converting a voice signal into a corresponding voltage signal suitable for being analyzed and processed by processor 169. Alternative voice sensing mechanisms may comprise, for example, a micro-accelerometer that detects physical movement of a thin membrane.

Module 140 preferably includes a communication interface unit 190 that facilitates communication between the smart card and the external world via one of multiple communication protocols. Communication interface 190 is responsible for detecting information that is formatted according to a particular protocol and converting the information to a format suitable for presentation to processor 169, which may be implemented as a general purpose microprocessor, a digital signal processor, or a suitable combination of both. In the depicted embodiment, communication interface 190 includes an ISO port 195 including RST, CLK, and I/O pins for an ISO7816 communication link, a USB port 197 including D+ and D− pins for a USB communication link, and a wireless port 199 for use in a contactless application in conjunction with an antenna 193.

Module 140 typically further includes a power source 194 to provide power to the functional elements of the module. In one embodiment, power source 194 is implemented as a battery that enables stand-alone operation of the smart card. Alternatively, the power source 194 may be a power circuit configured to receive power from a host system, such as a smart card reader, used in conjunction with the smart card. In this embodiment, the power provided by the host may be provided through the smart card contacts in a contact application or through the antenna in a contactless application.

Portions of the invention may be implemented as a sequence of processor executable instructions (software) stored on an integrated circuit storage medium. The storage medium may include a volatile storage medium such as a dynamic RAM or static RAM memory, or a persistent (non-volatile) memory such as a flash memory, EEPROM, ROM or FRAM. Memory 174 may, for example, may have recognition code that includes processor executable voice recognition or pattern recognition code for analyzing signals produced by voice sensor 192 to determine a set of characteristics corresponding to the voice. The recognition code may further include code for comparing the determined set of characteristics with a set of characteristics corresponding to the card holder's voice that is pre-loaded in memory 174 to identify the user and code for comparing the content of the user's speech to content, such as a password, that is stored in memory to authenticate the user as an authorized user of the smart card.

The software may further include code for recognizing and executing voice commands. In this embodiment, memory 174 may include one or more preloaded voice sequences where each preloaded voice sequence corresponds to a command that is recognized by the processor. When the voice recognition code detects a match between a command spoken by the user and a sequence preloaded into memory, the processor may execute a pre-defined sequence or task corresponding to the command. The command execution code may require identification or authentication of the user as a prerequisite.

In one embodiment, the computer code may include code that recognizes a particular word or phrase as the password that authenticates the user. The password may, itself, comprise a command that is recognized by the code such that the smart card can authenticate the user and execute a command in a single sequence. In this embodiment, the code may permit the smart card holder to alter the password as an added security measure such that a different word or phrase is required to authenticate the card. In another embodiment, the computer code recognizes specific characteristics of cardholder free speech as an alternative to a password and authenticates the user based upon the speech characteristics.

Figure 14:
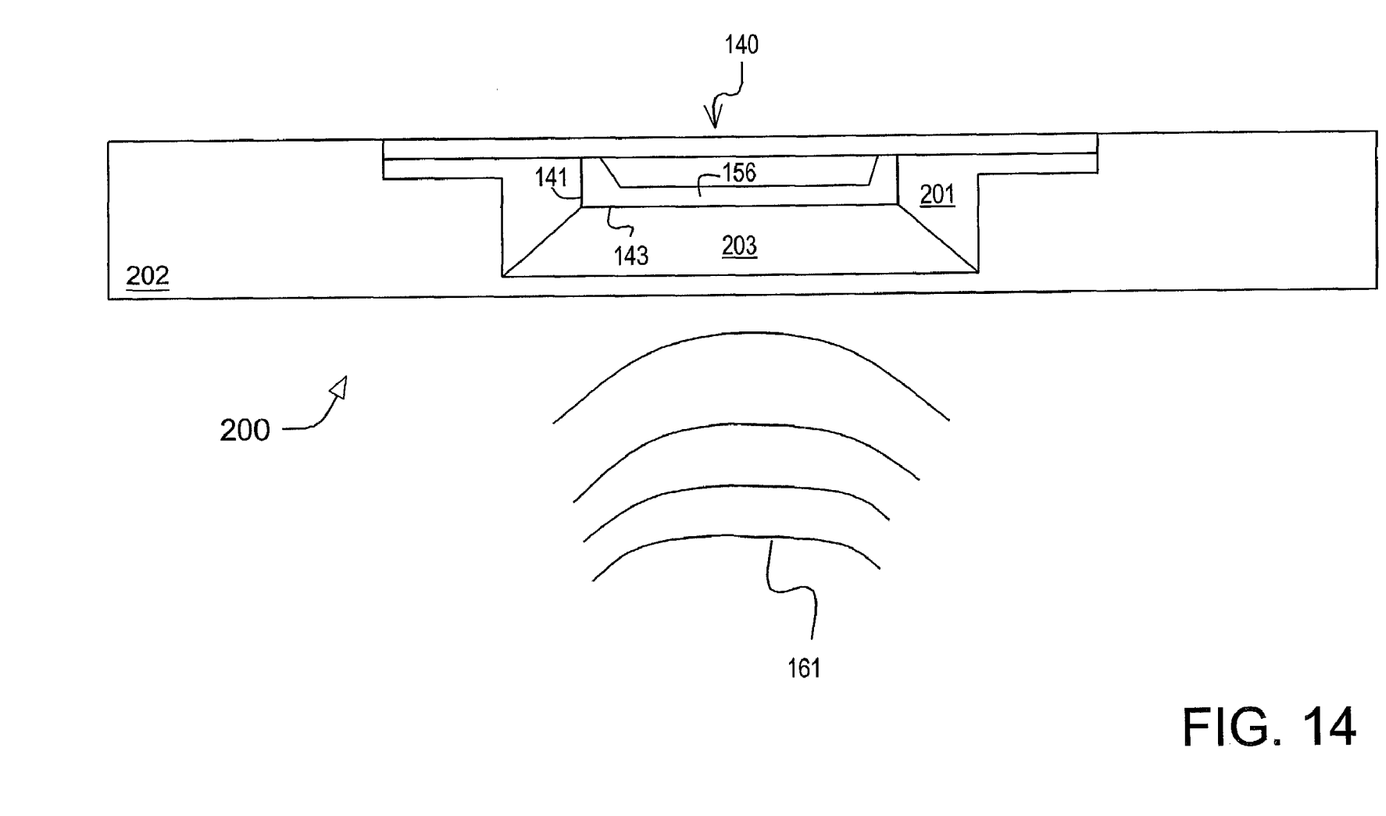
FIG. 14 is a cross-sectional view of a smart card according to one embodiment of the invention.

Referring to FIG. 14, a cross-sectional view of an embodiment of a smart card 200 is presented. Smart card 200 is typically compliant with the smart card specification of ISO 7816. In the depicted embodiment, smart card 200 includes a plastic bulk or frame 202 that defines a cavity 201. The cavity 201 is suitably sized to receive the smart card module 140 with the integrated circuit 141 located within the cavity 201. Smart card 200 according to the depicted embodiment further includes a compound 203 in contact with the front side or active layer 143 of integrated circuit 141. The compound 203 transfers voice pressure waves 204 from active layer 143 to the membrane 156 (also referred to as the sensitivity element) of integrated circuit 141 to facilitate the reception of the sound waves by the integrated circuit's voice sensor. In an embodiment of integrated circuit 141 that does not include a membrane, compound 203 transfers voice pressure waves from front side 143 of integrated circuit 141 to a sensitivity element comprising, for example, an electrode of a capacitor. In one embodiment, compound 203 includes a Room Temperature Vulcanized (RTV) silicon that provides a suitable medium for transmitting sound waves to the integrated circuit membrane.

Figure 15:
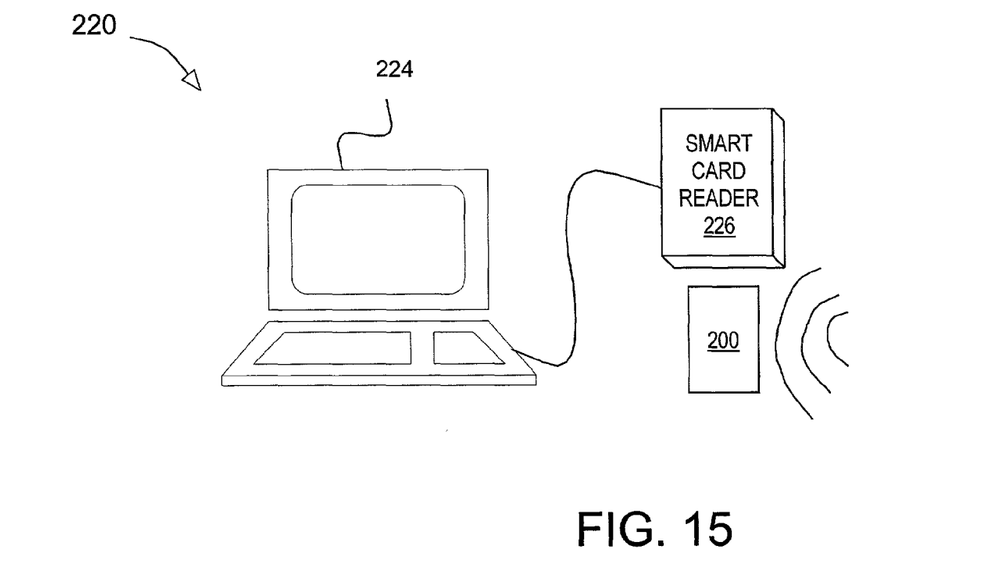
FIG. 15 is a diagram of a contact driven embodiment of a smart card system according to the present invention.
Figure 16:
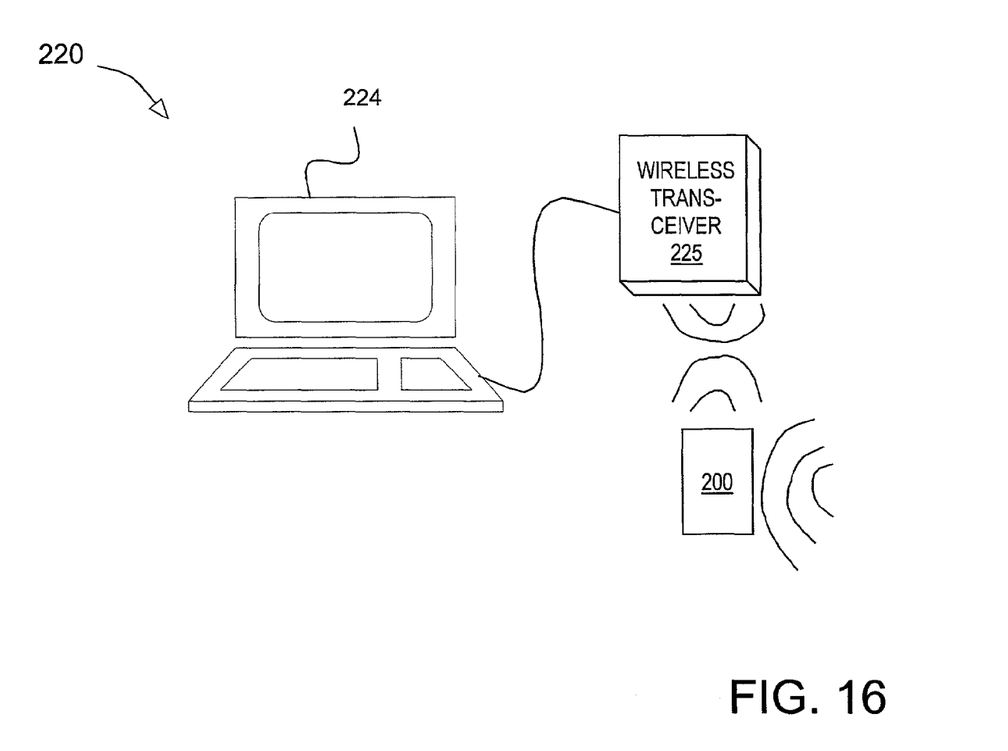
FIG. 16 is a diagram of a contactless -embodiment of a smart card system according to the present invention.

Referring now to FIG. 15, an embodiment of a system 220 used in conjunction with a voice activated smart card 200 is depicted. In the depicted embodiment, system 220 includes an external data processing device 224 connected to a smart card reader 122. The data processing device 224 may be implemented as a desktop or laptop personal computer, a dedicated workstation or server for processing smart card transactions, or any of a variety of commercially available data processing devices. Data processing device 224 is connected to and includes an interface for communicating with smart card reader 226. The data processing device 224 typically includes code or software that, when executing, prompts the user to insert smart card 200 into card reader 226. Upon insertion of the card 200 into reader 226, the data processing device 224 may prompt the cardholder to speak an indicated word or phrase. Alternatively, data processing device 224 may prompt the user to speak the password, which is presumably known only to the cardholder. In response to the appropriate prompt, the cardholder speaks the requested word or phrase in the vicinity of smart card 200. The smart card voice sensor, whether it be a piezoelectric pressure sensor, a capacitive pressure sensor, a mechanism for measuring acceleration or some other physical parameter, or some other means of detecting voice waves, then detects and conditions the spoken word or phrase, for presentation to the smart card processing circuitry for analysis and comparison to a pre-loaded voice signature. Upon authenticating the cardholder's voice as matching the voice sequence sample stored in the smart card's memory, smart card 200 is activated and enabled for use in the conventional manner depending upon the application. In addition to permitting voice authentication, one embodiment of smart card 200 is configured to respond to voice commands after the user (speaker) has been authorized Referring to FIG. 16, a contactless embodiment of a system 220 for utilizing a voice activated smart card 200 is depicted. In this embodiment, the data processing system 224 is connected to a wireless transceiver device 225 interface. In this embodiment, the card holder speaks to smart card 200 in response to a data processing system prompt with the smart card in proximity to the wireless transceiver 225. If smart card 200 authenticates the speaker as the authorized user, the card is enabled and the user may interact with the application running on the data processing device to perform a task. In this embodiment, smart card 200 may be powered by an internal power source such as a battery. Alternatively, transceiver 225 may transmit an electromagnetic power signal that is received by the smart card antenna. The power signal may provide the necessary power to activate smart card 200.

It will be apparent to those skilled in the art having the benefit of this disclosure that the present invention contemplates a method and system for implementing a voice activated smart card device. It is understood that the forms of the invention shown and described in the detailed description and the drawings are to be taken merely as presently preferred examples and that the invention is limited only by the language of the claims.

What is claimed is:

1. An integrated circuit card, comprising:
   an integrated circuit having a biometric voice sensor integrated into a portion of the integrated circuit wherein the voice sensor is configured to detect the speech of a user and to produce a signal responsive to the speech of the user;
   a memory for storing information indicative of at least one user's voice characteristics; and
   a voice processing circuit integrated into a portion of the integrated circuit, wherein the voice processing circuit is configured to receive the signal from the biometric voice sensor, to process the signal to detect characteristics of the at least one user's voice and to use a voice recognition technique to compare the detected voice characteristics with information stored in the memory, and to perform at least one task selected from the set including authenticating the user, identifying the user, executing a voice-transmitted command, encrypting a user's voice, and speech recognition.

2. The integrated circuit card of claim 1, further comprising means for establishing a data link to download data from which the stored information is derived.

3. The integrated circuit card of claim 1, wherein the integrated circuit card uses the stored information to authenticate the user.

4. The integrated circuit card of claim 1, wherein the integrated circuit is configured to execute a voice-transmitted command from the at least one user by comparing the characteristics of the voice sensor signal to information stored in the memory indicative of the voice characteristics of the at least one user speaking the command.

5. The integrated circuit card of claim 1, wherein the integrated circuit is further configured to encrypt the voice sensor signal using an algorithm.

6. The integrated circuit card of claim 1, wherein the integrated circuit is configured to recognize the content of the at least one user's speech.

7. The integrated circuit card of claim 1, wherein the voice sensor comprises a pressure sensor.

8. The integrated circuit card of claim 1, further comprising a communication interface unit comprising a portion of the integrated circuit and connected to the voice processing circuit, wherein the interface unit includes a serial interface for communicating information through contacts according to an at least one of an ISO and USB protocol.

9. The integrated circuit card of claim 1, further comprising a battery power source to power the device integrated circuit card.

10. The integrated circuit card of claim 1, further comprising a wireless port configured to receive an electromagnetic signal to power the device integrated circuit card.

11. The integrated circuit card of claim 1, wherein the communication interface unit further includes a wireless port for communicating information to and from the integrated circuit card in contactless applications.

12. The integrated circuit card of claim 1, wherein the information stored in the memory is indicative of a user speaking a password and the integrated circuit is configured to authenticate a user by comparing the characteristics of the voice sensor signal to the information stored thereby determining whether the user is speaking the password.

13. The integrated circuit card of claim 1, wherein the stored information identifies the user.

14. The integrated circuit card of claim 3, wherein the information is indicative of the voice characteristics of multiple users and wherein the integrated circuit card is configured to authenticate each of the multiple users.

15. The integrated circuit card of claim 3, wherein the integrated circuit is configured to authenticate a user of the integrated circuit card by comparing the characteristics of the voice sensor signal to information stored in memory indicative of a predetermined password.

16. The integrated circuit card of claim 6, wherein the recognized content is used to classify the at least one user's speech by keywords.

17. The integrated circuit card of claim 7, wherein the pressure sensor includes a membrane that responds to a voice pressure wave.

18. The integrated circuit card of claim 7, wherein the pressure sensor comprises a first ring oscillator comprising an odd number of CMOS inverters and configured such that its output frequency increases when the pressure increases.

19. The integrated circuit card of claim 7, wherein the pressure sensor comprises a first capacitor and second capacitor.

20. The integrated circuit card of claim 7, further comprising a compound in contact with the active layer wherein the compound transfers voice pressure waves to the sensitivity element of the pressure sensor.

21. The integrated circuit card of claim 7 wherein the pressure sensor comprising a set of pressure transducer.

22. The integrated circuit card of claim 14, wherein the integrated circuit card contains user specific profile information for each of the multiple users that enables user specific device functionality.

23. The integrated circuit card of claim 17 wherein the pressure sensor comprises a set of piezoelectric gauges arranged in proximity to the membrane portion and configured to detect resistivity changes induced by the voice pressure waves.

24. The integrated circuit card of claim 17, wherein the membrane is micro-machined into the integrated circuit.

25. The integrated circuit card of claim 17 wherein the membrane has a thickness in the range of 10.0 to 25.0 micrometers.

26. The integrated circuit card of claim 18, wherein the pressure sensor comprises a second ring oscillator comprising an odd number of CMOS inverter and configured such that its output frequency decreases when the pressure increases.

27. The integrated circuit card of claim 19, wherein the capacitance of the first capacitor varies responsive to voice pressure waves and the capacitance of the second capacitor remains substantially constant responsive to voice pressure waves.

28. The integrated circuit card of claim 19, wherein the first capacitor and second capacitor are connected in a half bridge configuration and connected to a signal processing unit configured to produce a voltage signal indicative of the change in capacitance of first capacitor.

29. The integrated circuit card of claim 20, wherein the compound comprises room temperature vulcanized silicon.

30. The integrated circuit card of claim 21 wherein the pressure transducer is a piezoelectric gauge comprising of polysilicon resistors in the vicinity of the membrane.

31. The integrated circuit card of claim 23, wherein the gauges are connected in a Wheatstone bridge configuration.

32. The integrated circuit card of claim 26, wherein the ratio of the first ring oscillator frequency and the second ring oscillator frequency is used to minimize temperature effects and optimize pressure sensitivity.

33. A method of processing voice waves with an integrated circuit card, comprising:
   generating an electrical signal with a voice sensor of the integrated circuit card responsive to speech spoken into the voice sensor;
   analyzing the electrical signal with a signal processing circuit of the integrated circuit card to detect characteristics of a user's voice; and
   using a voice recognition technique to compare the detected voice characteristics with information stored in a memory of the integrated circuit card and indicative of the user's voice, and to perform an action selected from the set including authenticating the user, identifying the user, executing a voice-transmitted command, encrypting a user's voice, and speech recognition.

34. The method of claim 33, wherein the action is authenticating the user and wherein authenticating the user includes comparing the characteristics of the voice sensor signal to information stored in the memory indicative of the user speaking a password.

35. The method of claim 33, wherein generating the electrical signal comprises using a first electrical parameter that increases with the voice pressure wave and a second electrical parameter that decrease or remains constant with the pressure wave and comparing the first and second parameters to determine the magnitude of the pressure wave.

36. The method of claim 33, further comprising, responsive to the comparison between the detected voice characteristics and the stored information, enabling communication between the integrated circuit card and the external data processing system.

37. The method of claim 33, wherein generating the electrical signal includes measuring variations in an electrical parameter caused by the voice pressure wave modifying an electrical characteristic of a pressure sensor of the integrated circuit.

38. The method of claim 35, wherein the first and second electrical signals comprise the voltage across first and second piezo resistors respectively.

39. The method of claim 35, wherein the first and second electrical signals are the capacitance of a first capacitor and the capacitance of a second capacitor respectively.

40. The method of claim 35, wherein the first and second electrical signals are the frequencies of first and second ring oscillators respectively.

41. The method of claim 36, wherein communication between the processing system and the smart card is done via at least one of an ISO port, a USB port, and a wireless port.

42. A portable device, comprising:

an integrated circuit having a biometric voice sensor integrated into a portion of the integrated circuit, the biometric voice sensor comprising a pressure sensor including a membrane that responds to a voice pressure wave and wherein the voice sensor is configured to detect the speech of a user and to produce a signal responsive to the speech of the user; and a voice processing circuit integrated into a portion of the integrated circuit, wherein the biometric voice processing circuit is configured to receive the signal from the biometric voice sensor and to process the signal to extract the voice characteristics representative of the user.

43. The portable device of claim 42, wherein the portable device is an integrated circuit card comprising a plastic frame in which the integrated circuit is embedded.

* * * * *